(12) United States Patent
Bukovnik et al.

(10) Patent No.: US 7,109,423 B1
(45) Date of Patent: Sep. 19, 2006

(54) ELECTRICAL CONNECTION PROTECTOR KITS, INSERT ASSEMBLIES AND METHODS FOR USING THE SAME

(75) Inventors: Rudolf Robert Bukovnik, Chapel Hill, NC (US); Jimmy E. Marks, Dunn, NC (US); Jeffery Judd, Wake Forest, NC (US); Mahmoud K. Seraj, Apex, NC (US); George W. Pullium, III, Garner, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/190,579

(22) Filed: Jul. 26, 2005

(51) Int. Cl.
*H02G 15/02* (2006.01)
(52) U.S. Cl. .................................. 174/77 R
(58) Field of Classification Search .............. 174/76, 174/77 R
See application file for complete search history.

(56) References Cited

U.S. PATENT DOCUMENTS

| | | | |
|---|---|---|---|
| 2,296,227 A | 9/1942 | Varga | |
| 2,792,444 A | 5/1957 | Bergan | |
| 2,803,696 A * | 8/1957 | Hefner | 174/88 R |
| 3,523,607 A | 8/1970 | Gillemot et al. | |
| 3,839,595 A | 10/1974 | Yonkers | |
| 4,053,704 A * | 10/1977 | Smith | 174/87 |
| 4,438,995 A | 3/1984 | Fisher et al. | |
| 4,721,832 A | 1/1988 | Toy | |
| 4,751,350 A | 6/1988 | Eaton | |
| 4,880,676 A | 11/1989 | Puigcerver et al. | |
| 4,888,070 A | 12/1989 | Clark et al. | |
| 5,023,401 A | 6/1991 | Clifton | |
| 5,099,088 A | 3/1992 | Usami et al. | |
| 5,140,746 A | 8/1992 | Debbaut | |
| 5,399,811 A | 3/1995 | Fremgen et al. | |
| 5,561,269 A | 10/1996 | Robertson et al. | |
| 5,625,167 A | 4/1997 | VanNoten et al. | |
| 5,641,943 A | 6/1997 | Sawamura | |
| 5,792,989 A | 8/1998 | Smith | |
| 5,821,460 A | 10/1998 | Marmy | |
| 5,824,954 A | 10/1998 | Biche et al. | |
| 5,828,005 A | 10/1998 | Huynh-Ba et al. | |
| 5,895,890 A | 4/1999 | Uchiyama et al. | |
| 5,912,433 A | 6/1999 | Pulido et al. | |
| 5,922,992 A | 7/1999 | Kinney et al. | |
| 5,962,811 A | 10/1999 | Rodrigues et al. | |
| 6,025,559 A | 2/2000 | Simmons | |

(Continued)

OTHER PUBLICATIONS

*Motor Lead Connections* (5300 Series), 3M, pp. 287-290, date unknown.

(Continued)

*Primary Examiner*—Chau N. Nguyen
(74) *Attorney, Agent, or Firm*—Myers Bigel Sibley & Sajovec, P.A.

(57) ABSTRACT

A connection protector kit for use with an electrical stub connection assembly, the stub connection assembly including first and second conductors forming a connection and defining a crotch therebetween, includes an insert assembly. The insert assembly includes an insert member and a sealant pad mounted on the insert member. The insert assembly is adapted to fit within the crotch of the stub connection assembly. The kit may further include a cap defining a cavity and an opening communicating with the cavity, wherein the cavity and the opening are adapted to receive the stub connection assembly and the insert assembly is adapted to fit within the crotch of the stub connection assembly when the stub connection assembly is mounted in the cavity.

21 Claims, 7 Drawing Sheets

U.S. PATENT DOCUMENTS

| | | |
|---|---|---|
| 6,085,209 A | 7/2000 | Pan |
| 6,156,976 A | 12/2000 | Kawamura et al. |
| RE37,340 E | 8/2001 | King, Jr. |
| 6,333,463 B1 * | 12/2001 | Bukovnik et al. ........ 174/77 R |
| 6,429,374 B1 | 8/2002 | Buard |
| 6,627,818 B1 | 9/2003 | Kamel et al. |
| 6,730,847 B1 | 5/2004 | Fitzgerald et al. |

OTHER PUBLICATIONS

*Motor Stub Splice Insulator*, T&B, pp. D124, D125 and D127, date unknown.

*[Untranslated Japanese language title] PST*, 3M, date unknown.

*Motor Lead Splicing*, 3M Electrical Products Division, p. 72, date unknown.

*Aerosols & Coatings*, 3M Electrical Products Division, p. 39, date unknown.

*Splice Insulators*, T&B, pp. M195 and M196, Jan. 21, 1985.

*Termination, Splicing and Marking*, Wesco, pp. 5-10, 1993.

Declaration of Rudy R. Bukovnik Under 37 C.F.R. § 1.132 on May 25, 2005.

* cited by examiner

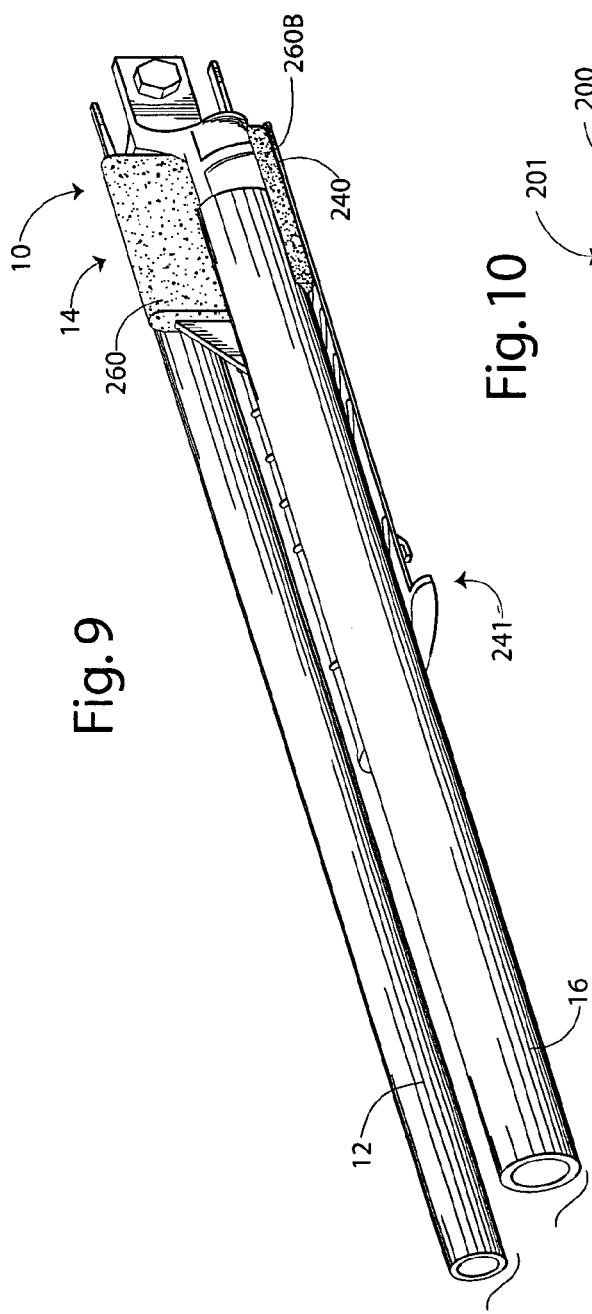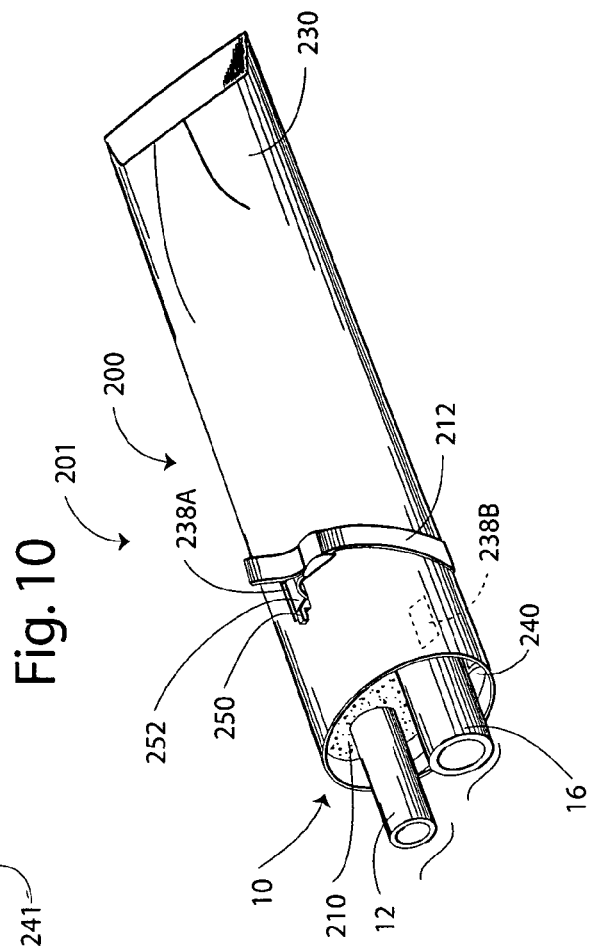

US 7,109,423 B1

ELECTRICAL CONNECTION PROTECTOR KITS, INSERT ASSEMBLIES AND METHODS FOR USING THE SAME

FIELD OF THE INVENTION

The present invention relates to electrical connectors and, more particularly, to means for protecting electrical connections.

BACKGROUND OF THE INVENTION

"V"-type electrical connections or splices (also referred to as "stub" or "pigtail"-type connections) are often employed for motor connections. Such electrical connections may be exposed to dust, moisture and/or other corrosives. The electrical connections may also be subjected to mechanical impacts and/or vibration. It is, therefore, desirable to protect the connection from the surrounding environment.

One method of protecting an electrical motor connection includes applying a gummy adhesive tape around the connection. Another method includes placing a plastic cap over the connection and securing the cap in place by wrapping an adhesive tape around the cap and connection cables. Yet another method includes placing a plastic cap over the connection and securing the cap in place by inserting a pin through the cap (which may be provided with preformed holes) and between the cables. In each of the latter two methods, a relatively thin layer of grease may be used to facilitate pushing the cap over the connection. It is also known to apply mastic to a connection and wrap or heat shrink a cover over the connection and mastic. Methods and kits employing a gel-filled cap are disclosed in U.S. Pat. No. 6,627,818 to Kamel et al.

While the foregoing methods provide some protection for V-type electrical connections, improved and more convenient protection is needed.

SUMMARY OF THE INVENTION

According to embodiments of the present invention, a connection protector kit for use with an electrical stub connection assembly, the stub connection assembly including first and second conductors forming a connection and defining a crotch therebetween, includes an insert assembly. The insert assembly includes an insert member and a sealant pad mounted on the insert member. The insert assembly is adapted to fit within the crotch of the stub connection assembly. The kit may further include a cap defining a cavity and an opening communicating with the cavity, wherein the cavity and the opening are adapted to receive the stub connection assembly and the insert assembly is adapted to fit within the crotch of the stub connection assembly when the stub connection assembly is mounted in the cavity.

According to further embodiments of the present invention, a method for protecting a stub connection assembly, the stub connection assembly including first and second conductors forming a connection and defining a crotch therebetween, comprises: mounting an insert assembly including an insert member and a sealant pad mounted thereon in the crotch of the stub connection assembly; and thereafter inserting the stub connection assembly with the insert assembly mounted therein into a cavity of a cap.

According to further embodiments of the present invention, a method for protecting a stub connection assembly, the stub connection assembly including first and second conductors forming a connection and defining a crotch therebetween, comprises: mounting a sealant pad in the crotch of the stub connection assembly; and thereafter inserting the stub connection assembly with the sealant pad mounted therein into a cavity of a cap such that the stub connection assembly displaces a cap sealant in the cavity.

According to embodiments of the present invention, a connection protector kit for use with an electrical stub connection assembly, the stub connection assembly including first and second conductors forming a connection and defining a crotch therebetween, includes a cap defining a cavity and an opening communicating with the cavity. A cap sealant is disposed in the cavity. The kit also includes an insert member having opposed front and rear portions and a securing structure on the rear portion. The kit is adapted to be assembled such that the stub connection assembly is disposed in the cavity of the cap and the insert member is positioned in the crotch of the stub connection assembly with the front portion engaging the connection and the securing structure coupling the insert member to the cap at a location spaced apart from the connection to thereby limit displacement of the stub connection assembly relative to the cap.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 9 is a perspective view of an electrical stub connection assembly with the insert assembly of FIG. 7 mounted therein;

FIG. 10 is a perspective view of a protected electrical connection assembly according to further embodiments of the present invention and including the electrical connection and the insert assembly of FIG. 9;

DETAILED DESCRIPTION OF THE PREFERRED EMBODIMENTS

Figure 1:
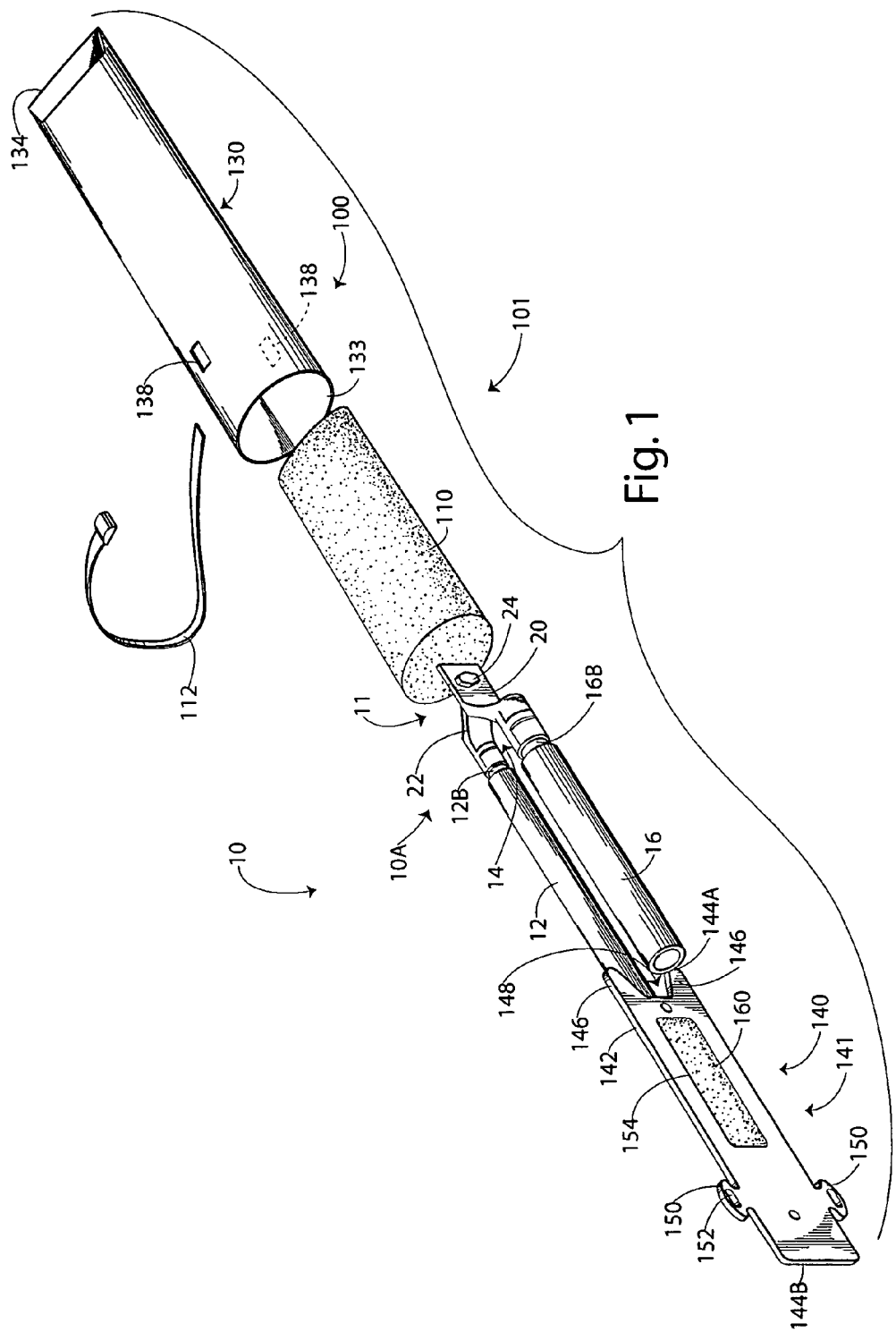
FIG. 1 is an exploded, perspective view of a protected electrical connection assembly according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

With reference to FIGS. 1–5, an electrical connection protector kit according to embodiments of the present invention is shown therein and generally designated 100. The kit 100 includes a mass of sealant 110, a cap 130, an insert assembly 141 and a tie wrap 112. The insert assembly 141 includes an insert member 140 and a sealant mass or pad 160. The kit 100 may be mounted on a V-shaped stub connection assembly 10 (which includes a connection 11) to provide a protected electrical connection assembly 101, which is shown fully assembled in FIG. 3.

As will be appreciated from the description that follows, the kit 100 may be quickly installed and cold-applied (i.e., installed without requiring heating). The kit 100 may provide a reliable and consistent seal to protect the connection assembly 10 from moisture, dirt, dust, corrosives and other harmful environmental substances. The kit 100 may provide such protection even when the connection assembly 101 is submerged in water or other fluid. Moreover, the kit 100 may serve to dampen vibration to reduce or eliminate any tendency for such vibration to loosen the connection 11. The kit 100 may also electrically and thermally insulate the connection 11 and provide fire retardance. The insert assembly 141 may serve to ensure at least a prescribed minimum sealing distance and depth of the connection 11 into the cap 130.

Figure 4:
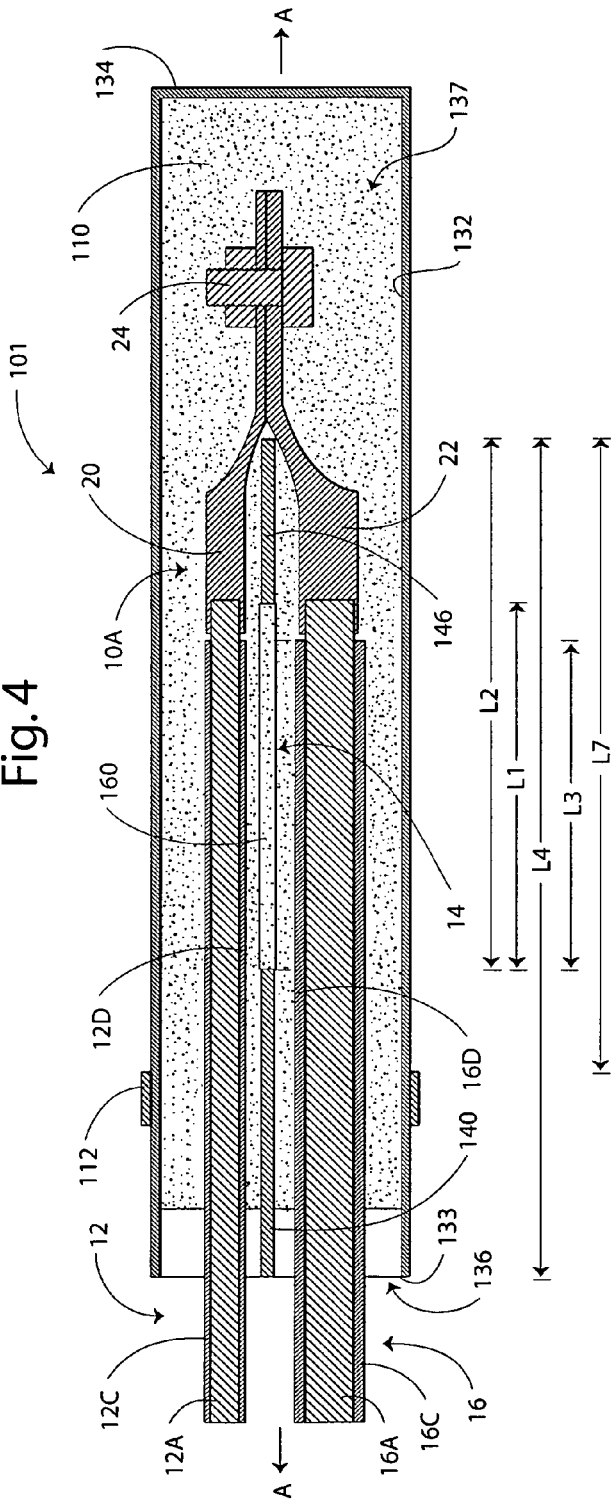
FIG. 4 is a cross-sectional view of the protected electrical connection assembly of FIG. 3 taken along the line 4—4 of FIG. 3.
Figure 5:
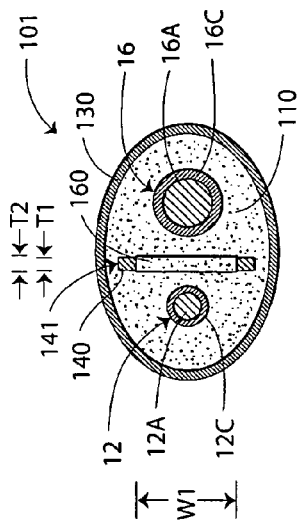
FIG. 5 is a cross-sectional view of the protected electrical connection assembly of FIG. 3 taken along the line 5—5 of FIG. 3.

Turning to the kit 100 in more detail and with reference to FIGS. 1 and 4, the cap 130 is preferably formed of a molded or extruded polymeric material. According to some embodiments, the cap 130 is extruded as a tube and then sealed on one end.

According to some embodiments, the cap 130 is formed of an elastomer, and more particularly of a thermoplastic elastomer. Suitable materials include SANTOPRENE, a polypropylene/rubber blend, neoprene, silicone or EPDM. Polyurethane may be preferred. The cap 130 may be formed of a flame retardant material. For example, the polymeric material of the cap 130 may include a suitable additive to make the cap 130 flame retardant.

According to some embodiments, the cap 130 is formed of a flexible material. According to some embodiments, the cap material has a durometer of between about 40 Shore A and 45 Shore D, more preferably of between about 50 Shore A and 40 Shore D, and, most preferably, of between about 65 and 90 Shore A. According to some embodiments, the material of the cap 130 has a tensile strength of between about 4 and 21 MPa, and more preferably of between about 4.6 and 12.0 MPa.

For the purposes of discussion, the cap 130 has an axis A—A (see FIG. 4). The cap 130 has an interior surface 132, an open end 133 and an opposing closed end 134. An opening 136 defined in the open end 133 communicates with a cavity 137 defined within the cap 130 by the interior surface 132. Radially opposed holes 138 are defined in the cap 130 adjacent the open end 133. The holes 138 may be pre-formed (e.g., molded) or punched in the cap after the cap is molded. The holes 138 define a transverse axis extending through each of the holes 138. According to some embodiments, and as illustrated, the cap 130 is free of openings other than the opening 136 and the holes 138.

Figure 6:
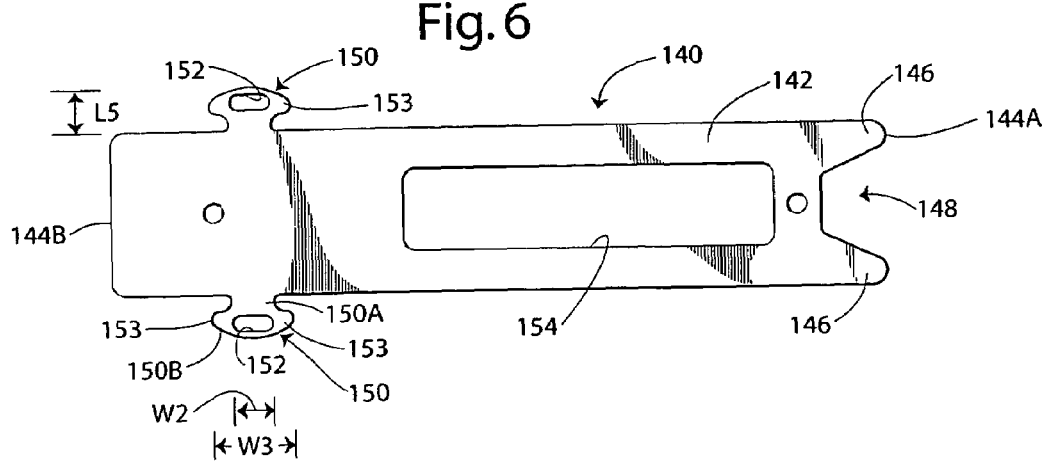
FIG. 6 is a side elevational view of an insert member forming a part of the protected electrical connection assembly of FIG. 1.
Figure 7:
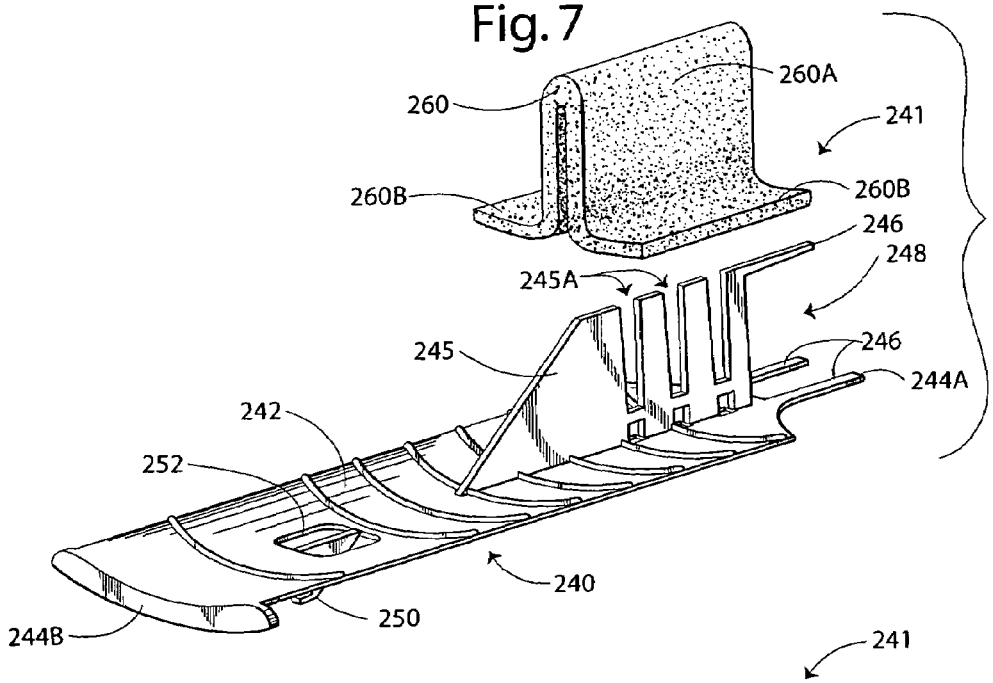
FIG. 7 is an exploded, top perspective view of an insert assembly according to further embodiments of the present invention.
Figure 8:
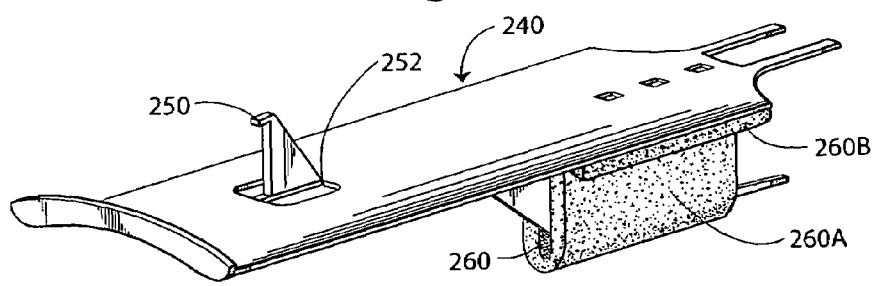
FIG. 8 is a bottom perspective view of the insert member of FIG. 7.

The insert member 140 (also shown in FIG. 6) includes a body 142 that, as illustrated, may be generally flat and plate-shaped. The insert member 140 extends axially from a rear end 144B to a front end 144A. A pair of spaced apart arms 146 extend forwardly from the body 142 and define a slot 148 therebetween. A pair of opposed, integral lock tabs or projections 150 extend radially outwardly from the body 142 adjacent the rear end 144B. Each lock tab 150 has a shaft portion 150A and a head 150B including opposed tabs 153 extending beyond the shaft portion 150A on either side (FIG. 6). A hole 152 extends through each head 150B. An opening 154 is defined in the body 142 as well.

The insert member 140 may be formed of any suitable material. The material of the insert member 140 is preferably electrically insulative and relatively stiff. The insert member 140 may be formed of a rigid and electrically insulating engineering plastic such as polycarbonate or polypropylene. The insert member 140 may be formed by any suitable means including, for example, molding or extrusion and cutting. According to some embodiments, the insert member 140 is molded. According to some embodiments, the insert member 140 is integrally and unitarily formed.

According to some embodiments, the material of the insert member 140 has a flexural modulus of at least about 965 MPa. According to some embodiments, the flexural modulus is between about 1,400 MPa and 5,500 MPa.

According to some embodiments, the insert member 140 has a thickness T1 (FIG. 5) of between about 2 and 5 mm. According to some embodiments, the projections 150 have a radially extending length L5 (FIG. 6) of at least about 5 mm. According to some embodiments, the length L5 is between about 8 and 12 mm. According to some embodiments, the width W2 (FIG. 6) of each shaft portion 150A is between about 0.5 and 3 mm less than the length L6 (FIG. 2) of the corresponding hole 138 of the cap 130. According to some embodiments, the width W3 (FIG. 6) of each head 150B is between about 3 and 8 mm greater than the length L6.

The sealant mass 110 and the sealant pad 160 may be any suitable sealant materials. The sealant mass 110 and the sealant pad 160 may be formed of the same or different materials. According to some embodiments, the sealant mass 110 and the sealant pad 160 are formed of mutually adherent materials. According to some embodiments, the sealant mass 110 and the sealant pad 160 are formed of the same material; however, the sealant mass 110 and the sealant pad 160 may be formed of different materials. According to some embodiments, the sealant mass 110 and the sealant pad 160 are each masses of gel, and the sealant mass 110 and the sealant pad 160 will hereinafter be referred to as gels; however, it will be appreciated that in accordance with other embodiments suitable non-gel sealants (such as a silicone grease or a hydrocarbon-based grease) may be employed. As discussed below, aspects of embodiments of the present invention may provide particular benefits and address particular needs where a gel is employed as one or both of the sealant masses 110, 160.

As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the key definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of each of which are hereby incorporated herein by reference. These fluid-extended silicone gels may be created with nonreactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis(dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in the aforementioned Debbaut '261 and U.S. Pat. No. 5,140,476 Debbaut (hereinafter "Debbaut '476") and gels based on styrene-ethylene butylenestyrene (SEBS) or styrene-ethylene propylene-styrene (SEPSS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used are EPDM rubber-based gels, as described in U.S. Pat. No. 5,177,143 to Chang et al.

Yet another class of gels which may be used are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (i.e., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer TA-XT2 commercially available from Texture Technologies Corp. of Scarsdale, N.Y., or like machines, having a five kilogram load cell to measure force, a 5 gram trigger, and ¼ inch (6.35 mm) stainless steel ball probe as described in Dubrow '300, the disclosure of which is incorporated herein by reference in its entirety. For example, for measuring the hardness of a gel a 60 mL glass vial with about 20 grams of gel, or alternately a stack of nine 2 inch×2 inch×⅛" thick slabs of gel, is placed in the Texture Technologies Texture Analyzer and the probe is forced into the gel at the speed of 0.2 mm per sec to a penetration distance of 4.0 mm. The hardness of the gel is the force in grams, as recorded by a computer, required to force the probe at that speed to penetrate or deform the surface of the gel specified for 4.0 mm. Higher numbers signify harder gels. The data from the Texture Analyzer TA-XT2 may be analyzed on an IBM PC or like computer, running Microsystems Ltd, XT.RA Dimension Version 2.3 software.

The tack and stress relaxation are read from the stress curve generated when the XT.RA Dimension version 2.3 software automatically traces the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$\frac{(F_i - F_f)}{F_i} \times 100\%$$

where $F_i$ and $F_f$ are in grams. In other words, the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400 ($10^{-1}$ mm). Harder gels may generally have CP values from about 70 ($10^{-1}$ mm) to about 120 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

According to some embodiments, the gel has a Voland hardness, as measured by a texture analyzer, of between about 5 and 100 grams force. The gel may have an elongation, as measured by ASTM D-638, of at least 55%. According to some embodiments, the elongation is of at least 100%. The gel may have a stress relaxation of less than 80%. The gel may have a tack greater than about 1 gram. Suitable gel materials include POWERGEL sealant gel available from Tyco Electronics Energy Division of Fuquay-Varina, NC under the RAYCHEM brand.

The gel 110 is placed in the cavity 137 of the cap 130 by any suitable technique. According to some embodiments, the gel 110 is pre-installed in the cavity 137 so that the installer need not place the gel in the cap 130 as part of the installation procedure. A liquid gel material may be placed in the cavity 137 and cured in situ. Alternatively, the installer may be provided with the cap 130 and the gel 110 separately, in which case the installer will place the gel 110 in the cavity 137 (typically prior to inserting the connection 10). Preferably, the gel 110 is placed fully in the rear of the cavity 137 such that there are substantially no voids in the cavity 137 between the closed end 134 and the surface of the gel 110 adjacent the open end 133.

The gel pad 160 is placed in the opening 154 of the insert member 140 by any suitable technique to form the insert assembly 141. According to some embodiments, the gel pad 160 is pre-installed in the opening 154 so that the user need not place the gel in the insert member 140 as part of the installation procedure. A liquid gel material may be placed in the opening 154 and cured in situ. Alternatively, the installer may be provided with the insert member 140 and the gel pad 160 (which may be pre-cured) separately, in which case the installer will place the gel pad 160 in the opening 154 to form the insert assembly 141.

According to some embodiments, the gel pad 160 has a width W1 (FIG. 5) of at least about 10 mm. According to some embodiments, the width W1 is between about 16 and 18 mm. According to some embodiments, the width W1 is greater than or equal to one-half the diameter of the largest cable intended for use with the insert assembly 141. According to some embodiments, the gel pad 160 has a thickness T2 (FIG. 5) of at least about 4 mm. According to some embodiments, the thickness T2 is between about 4 and 8 mm. According to some embodiments, the thickness T2 is between about 2 and 6 mm greater than the thickness T1 (FIG. 5) of the insert member 140.

The tie wrap 112 may be of any suitable construction, such devices being well known to those of skill in the art. For example, the tie wrap 112 may be a conventional cable tie or zip tie. The tie wrap 112 includes a flexible strip 114 and a lock head 116. The tie wrap 112 may be formed of any suitable material, such as a polymeric material. The tie wrap 112 may be integrally formed.

The stub connection assembly 10 is illustrative of a connection assembly with which the kit 100 may be employed. However, the kit 100 may be used with stub-type connections of other types such as, for example, a crimped stub connection, a mechanical stub connection, or a twisted stub connection. As used herein, "stub connection" means any connection wherein two or more wires or cables are joined at or near their ends to form a generally V-shaped connection. The connection assembly 10 is illustrative of, for example, a conventional motor connection assembly.

The connection assembly 10 as illustrated includes two cables 12, 16. The cables 12, 16 may be replaced with any suitable elongated, electrically conductive elements. Each cable 12, 16 has an elongated electrical conductor 12A, 16A and a surrounding insulator 12C, 16C (see FIG. 4). The cables 12, 16 have respective lugs or connectors 20, 22 secured to their terminal ends. Bolts 24 extend through holes 20A and 22A in the lugs 20, 22 and are secured in place by cooperating nuts to form the connection 11. In addition to the connection 11 formed by the lugs 20, 22 and the bolts/nuts 24, uninsulated portions 12B, 16B (FIG. 1) of the conductors 12A, 16A are located adjacent the lugs 20, 22. The connection 11 and the conductor portions 12B, 16B are referred to herein collectively as the exposed electrically conductive portions 10A. The cables 12, 16 and the connection 11 define a generally V-shaped crotch 14 therebetween. There may be one or more additional cables secured with the ends of the cables 12, 16, and these additional cables may form further V-shaped crotches with the cable 12, the cable 16 and/or with one another.

Figure 2:
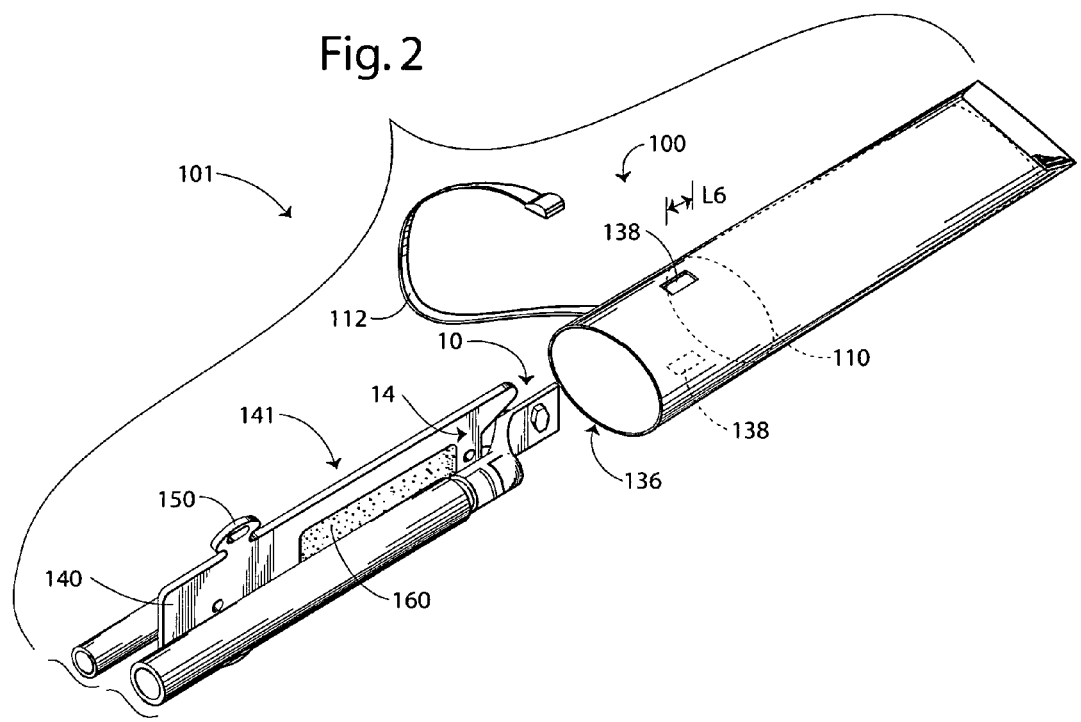
FIG. 2 is a partially exploded, perspective view of the protected electrical connection assembly of FIG. 1.

With reference to FIGS. 1–5, the kit 100 may be installed on the connection assembly 10 in the following manner. The insert assembly 141 is inserted into the crotch 14 of the connection assembly 10 as shown in FIG. 2. The arms 146 engage the rear edges of the blade portions of the lugs 20, 22. The slot 148 can accommodate lugs or connections of various sizes up to a maximum size. The insert member body 142 and the gel pad 160 are positioned between the cables 12, 16.

Thereafter, the connection assembly 10 and the insert assembly 141 are pushed into the cavity 137 until the projections 150 align with the holes 138 in the cap 130. The projections may automatically protrude through the holes 138 or the installer may manipulate the cap 130 and or the insert member 140 as needed to expose the projections 150 through the holes 138. For example, the installer may force the heads 150B through the holes 138 to temporarily elastically deform the surrounding material of the cap 130.

As the connection assembly 10 is inserted, the connection assembly 10 and the interior surface 132 of the cap 130 apply a compressive force to the gel 110. As a result, the gel 110 deforms to fill substantially all of the empty spaces within the cap 130 between the cap 130, the insert assembly 141 and the connection assembly 10. More particularly, the gel 110 elongates and is generally deformed to substantially conform to the outer surfaces of the connection assembly 10 and to the interior surface 132. Some shearing of the gel 110 may occur as well. A portion of the gel 110 may be displaced out of the cap 130. The displaced gel 110 further engages the gel pad 160 and the insert member 140 in the crotch 14. While the gel 110 and the gel pad 160 are shown as distinct masses in FIGS. 4 and 5 for clarity, it will be appreciated that the gel masses 110, 160 may merge and/or intermingle.

With reference to FIG. 4, according to some embodiments, the volumes, shapes and sizes of the gel 110, the cap 130, the insert member 140, and the gel pad 160 are selected and the kit is installed such that the substantial entirety of the exposed electrically conductive portions 10A of the connection assembly 10 are substantially fully immersed in the gel 110, 160. Additionally, the insulated portions 12D, 16D of the cables 12, 16 immediately adjacent the exposed conductor portions 12B, 16B are substantially completely surrounded by the gel 110, 160. In this manner, and as discussed below, the gel pad 160 ensures good sealant coverage of the cables 12, 16 in the area of the crotch 14 and along a prescribed minimum seal length.

According to some embodiments, at least some of the gel deformation is elastic. The gel 110 thus operates as a spring and exerts a restoring force on the connection 10 tending to eject the connection assembly 10 out of the cap 130 through the opening 136. However, the insert member 140 abuts the crotch 14 of the connection assembly 10 and thereby limits relative displacement of the cap 130 and the connection assembly 10 by the gel 110. More particularly, the projections 150 interlock with the holes 138 in the cap 130 to restrict relative axial displacement between the cap 130 and the insert member 140, thereby preventing the gel 110 from pushing the connection assembly 10 out of the cap 130.

Once the connection assembly 10 is positioned in the cavity 137 as described above, the tie wrap 112 can be inserted through the holes 152 and wrapped circumferentially about the outside of the cap 130 as shown. According to some embodiments, the insert member 140 and the cap 130 are configured such that tie wrap 112 is not required to secure the insert member 140 in place, but may serve as a security feature to resist dislodgement of the insert member as a result of vibration, rough handling or the like. According to some embodiments and as illustrated, the heads 150B are oversized and configured relative to the holes 138 such that the heads 150B (in particular, the tabs 153) positively interlock with the holes 138.

According to some embodiments, the insert member 140 and the cap 130 are configured such that, when the projections 150 are interlocked with the holes 138, the cap 130 is not collapsed or is not collapsed by more than a prescribed amount. If the tie wrap is employed, the installer may selectively draw the tie wrap 112 such that the cap 130 is not collapsed or compressed thereby. Alternatively, the installer may selectively draw the tie wrap 112 such that the cap 130 is collapsed or compressed. In this manner, the volume of the cavity 137 immediately about and near the exposed electrically conductive portions 10A (FIG. 4) of the connection assembly 10 is maintained at at least a prescribed minimum volume. This may ensure that the exposed connection portions 10A are surrounded by a sufficient amount of insulative gel 110 rather than the gel 110 being displaced from about the exposed connection portions 10A by compression of the cap 130. This may also reduce or minimize mechanical stress on the portion of the cap 130 adjacent the exposed connection portions 10A. Additionally, the installer may draw the tie wrap 112 to selectively reduce the volume of the overall cavity 137 and thereby place the gel 110 under further compressive force. This additional compressive force may further elongate and elastically deform the gel 110. Because the tie wrap 112 is located at a distance from the exposed connection portions 10A (which are positively located relative to the tie wrap 112 by the insert member 140), the compression of the cap 130 thereby does not displace the gel 110 from about the exposed connection portions 10A.

According to some embodiments, when the kit 100 is installed, the gel 110 has a minimum elongation at the interface between the gel 110 and the exposed electrically conductive surfaces 10A of the connection assembly 10 of at least 50%.

Various properties of the gel 110 and/or the gel 160 as described above may ensure that the gel 110, 160 maintains a reliable and long lasting hermetic seal between the cap 130 and the connection assembly 10. The elastic memory of and the retained or restoring force in the elongated, elastically deformed gel 110, 160 generally cause the gel to bear against the mating surfaces of the connection assembly 10 and the interior surface 132 of the cap 130. Also, the tack of the gel 110, 160 may provide adhesion between the gel and these surfaces. The gel 110, 160, even though it is cold-applied, is generally able to flow about the connection assembly 10 and the cap 130 to accommodate their irregular geometries.

According to some embodiments, the gel 110, 160 is a self-healing or self-amalgamating gel. This characteristic, combined with the aforementioned compressive force between the connection assembly 10 and the cap 130, may allow the gel 110, 160 to re-form into a continuous body if the gel 110 is sheared by the insertion of the connection assembly 10 into the cap 130. The gel may also re-form if the connection assembly 10 is withdrawn from the gel 110.

The kit 100 may provide a number of advantages over many prior art methods for protecting a stub-type electrical connection. The kit 100 may be effectively cold-applied. According to some embodiments, the kit 100 may be installed by simply inserting the insert assembly 141 in the crotch 14 of the connection assembly 10, inserting the insert assembly 141 and the connection assembly 10 into the cap 130, and then optionally inserting the tie wrap 112. The projections 150 may be sufficient to retain the insert assembly 141 and the connection assembly 10 in place in the cap indefinitely or at least until the tie wrap 112 has been installed so that a single installer can conveniently install the kit 100. Hence, the kit 100 may be quickly and consistently installed without requiring special tools, heat or inordinate strength or dexterity, and without mess. A kit 100 including a cap 130 of a given size can effectively accommodate connection assemblies 10 of a range of different sizes and including more or fewer cables 12, 16.

The insert member 140 and the gel pad 160 may provide improved electrical isolation between the connection assembly 10 and the environment. In the absence of the insert assembly 141, the gel 110 may tend not to engage and form a complete seal about the cable portions 12D, 16D in the area of the crotch 14, allowing one or more gaps to remain that may contain air or water. Such air or water may present an electrical leak path that reduces the insulation performance of the assembled kit 100. The insert member 140 and the gel pad 160 serve to fill at least a portion of the volume of the crotch 14, reducing the amount of the gel 110 that must be displaced into the crotch to prevent gaps and provide the desired amount of gel coverage about the connection assembly 10. Additionally, the gel pad 160 serves to form an effective air and water impermeable, electrically insulative seal with the gel 110.

The length of the seal provided by the gel pad 160 will generally be substantially the same as the length L1 of the gel pad 160. The length L1 will depend on the dimensions of the connection 10, the cap 130 and/or the gel 110. According to some embodiments, the length L1 is at least about 25 mm. According to some embodiments, the length L1 is between about 25 and 75 mm. According to some embodiments, the length L1 is between about 25 and 100 mm. The seal provided by the gel pad 160 will extend a distance L2 from the connection 11. According to some embodiments, the distance L2 is at least about 10 mm. According to some embodiments, the distance L2 is between about 10 and 50 mm. The configuration of the insert member 140 and the length L1 of the gel pad 160 will determine the effective seal length L3 from the front end of the insulation covers 12C, 16C to the rear end of the gel pad 160. According to some embodiments, the distance L3 is at least about 25 mm. According to some embodiments, the distance L3 is between about 25 and 85 mm.

The insert member 140 also serves to ensure that the connection is inserted and maintained in the cavity 137 of the cap 130 at at least a certain prescribed depth. By providing at least a prescribed amount of the gel 110 in the cavity 137, at least a minimum level of coverage can be assured. According to some embodiments, the depth L4 of the connection 11 in the cavity 137 as a result of the insert member 140 is at least about 80 mm. According to some embodiments, the depth L4 is between about 133 and 160 mm.

The areas about the exposed connection portions 10A (e.g., the lugs 20, 22) are high electrical stress areas in use, particularly in the case of high impulse voltages. As noted above, because the projections 150, and thus the tie wrap 112, are located at a distance from the connection portions 10A, compression of the cap 130 by the projections 150 and/or the tie wrap 112 in the regions adjacent or near the connection portions 10A is reduced or minimized. Thus, the projections 150 serve as securing features proximate the rear end of the insert member 140 that couple the insert member 140 to the cap 130 at a location spaced apart from the exposed connection portions 10A. This may serve to improve the environmental and electrical insulation performance of the kit 100. As mentioned above, the reduction in or elimination of cap compression in these regions reduces the displacement of the gel 110 from about the connection portions 1A. Additionally, by not compressing the cap 130 in these regions, attendant mechanical stresses on and reductions in the thickness of the wall of the cap 130 in these regions are prevented or reduced. It has been found that such mechanical stresses adversely affect the electrical insulation performance of the kit 100, particularly in high voltage applications (e.g., greater than 50 kV impulse testing).

According to some embodiments, the distance L7 (FIG. 4) between the projections 150 and the connection 11 in the assembly 101 is at least about 5 mm. According to some embodiments, the distance L7 is at least about 100 mm. According to some embodiments, the distance L7 is between about 100 and 150 mm.

Insert assemblies (e.g., the insert assembly 141) of different configurations can be provided to accommodate various connection structures and performance requirements. For example, where a longer or shorter seal length is desired, the gel pad of the insert assembly can be extended or shortened, respectively. If a greater or lesser depth position within the cap 130 is desired, a longer or shorter insert member can be employed. Thus, an installer or supplier may select from or design a plurality of insert assemblies to tailor the kit to the performance requirements of a given application.

The gel 110 and the gel 160 may provide a reliable moisture barrier for the connection assembly 10, even when the assembly 101 is submerged or subjected to extreme temperatures and temperature changes. According to some embodiments, the cap 130 is made from an abrasion resistant material that resists being punctured by the abrasive forces between the motor box and the connection assembly 10.

The gel 110 and the gel 160 may also serve to reduce or prevent fire. The gel is typically a more efficient thermal conductor than air and, thereby, may conduct more heat from the connection. In this manner, the gel 110 may reduce the tendency for overheating of the connection assembly 10 that might otherwise tend to deteriorate the cable insulation and cause thermal runaway and ensuing electrical arcing at the connection 11. According to some embodiments, the gel 110, 160 is flame retardant.

With reference to FIG. 10, an electrical connection protector kit 200 according to further embodiments of the present invention and a protected electrical connection assembly 201 including the kit 200 mounted on the connection assembly 10 are shown therein. The kit 200 generally corresponds to the kit 100 except that an insert assembly 241 is provided in place of the insert assembly 141, and the cap 230 may be modified to cooperate with the insert assembly 241. The insert assembly 241 includes an insert member 240 and a gel pad 260.

The insert member 240 has a front end 244A, a rear end 244B, and a body 242, which may be arcuate in cross-section as illustrated. An upstanding wall 245 extends radially outwardly from the body 242. Arms 246 extend forwardly from the front ends of the body 242 and the wall 245.

A hole 252 is formed in the body 242 proximate its rear end. A projection 250 extends radially outwardly from the body 242 adjacent the hole 252. As shown, the projection may be shaped as a hook. Slots 245A are formed in the wall 245. The insert member 240 may be formed in the same manner and of the same materials as discussed above with regard to the insert member 140.

The gel pad 260 may be formed in the same manner and of the same materials as discussed above with regard to the gel pad 160. The gel pad 260 has a center wall 260A and a pair of opposed lateral extension walls 260B and is mounted on the wall 245 and the base 242 as shown. The slots 245A may assist in retaining the gel pad 260 on the wall 245.

The cap 230 (FIG. 10) may be formed in the same manner and of the same materials as discussed above with regard to the cap 130 except that the cap includes a pair of opposed holes 238A, 238B which may be enlarged as compared to the holes 138. The cap 230 may be pre-filled with a mass of gel 210 corresponding to the gel 110.

The kit 200 may be used in a manner similar to that described with regard to the kit 100. The gel pad 260 may be pre-mounted on the insert member 240 by the installer or the manufacturer to form the insert assembly 241. The insert assembly 241 is mounted in the crotch 14 of the connection assembly 10 as shown in FIG. 9 such that the cables 12, 16 are cradled by the body 242 and the wall 245 on opposed sides of the wall 245.

The connection assembly 10 and the insert assembly 241 are then inserted into the gel-filled cap 230 as shown in FIG. 10. The connection assembly 10 and the insert assembly 241 are positioned such that the projection 250 extends through the hole 238A. The push back force from the gel 210 will tend to force the projection 250 back against the rear edge of the hole 238A such that the hole 252 in the insert member 240 aligns with the hole 238A through which the projection 250 extends. The projection 250, which may be hook-shaped as illustrated, thereby retains the insert assembly 241 and the connection assembly 10 in place with respect to the cap 230.

Optionally, the installer may install a tie wrap 212 to further secure the insert assembly 241 in the cap 230. The tie wrap is routed through the hole 238A, the hole 252, the cavity of the cap 230, and the hole 238B, and around the outside of the cap 230 as shown.

Figure 11:
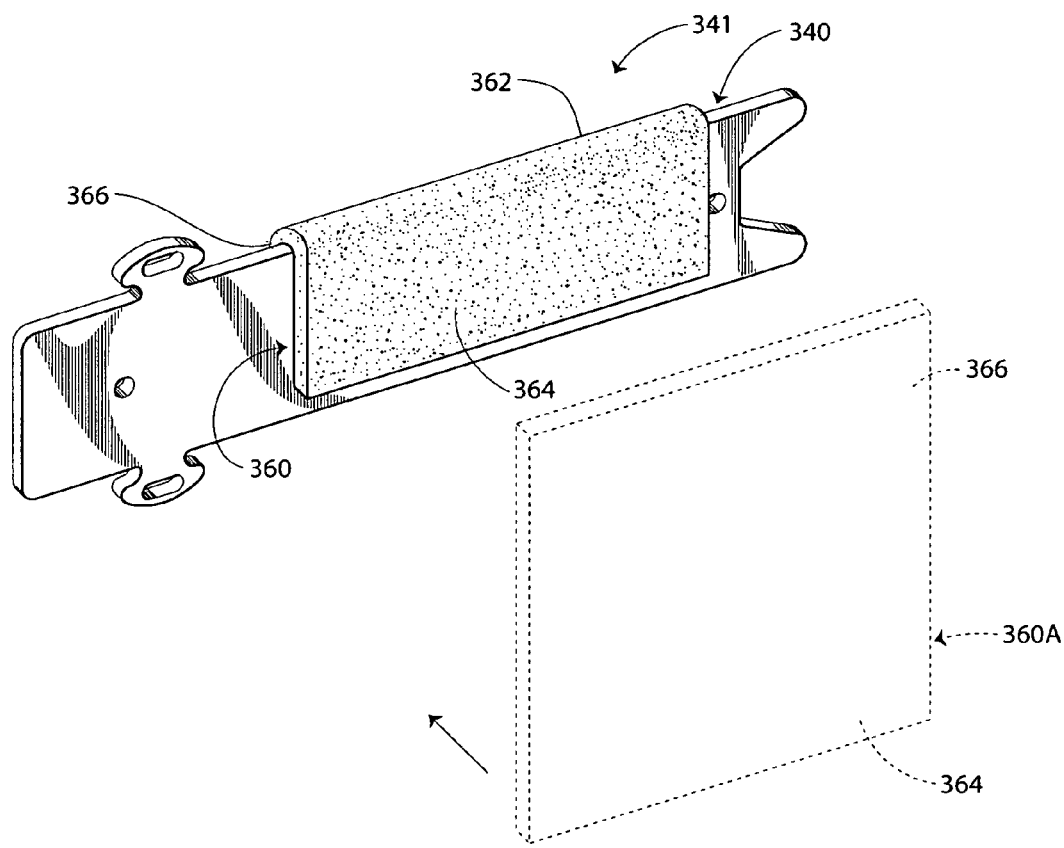
FIG. 11 is a perspective view of an insert assembly according to further embodiments of the present invention.

With reference to FIG. 11, an insert assembly 341 according to further embodiments of the present invention is shown therein. The insert assembly 341 may be used in an electrical protection kit 100, 200 as described above in place of the insert assembly 141 or the insert assembly 241, for example.

The insert assembly 341 includes an insert member 340 generally corresponding to the insert member 140, but which may omit the opening 154. A gel pad 360 is mounted on the insert member 340. The gel pad 360 includes a pair of gel pad sections 364 and 366 disposed on opposed sides of the insert member 340 and joined by a fold 362.

The gel pad 360 may be pre-mounted on the insert member 340 by the manufacturer. According to other embodiments, the gel pad is provided to the installer as a gel pad 360A (shown in dashed lines in FIG. 11) separate from the insert member 340. The installer then folds the gel pad 360A onto the insert member 340 to form the insert assembly 341 before installing the insert assembly 341 in the connection assembly 10.

Figure 12:
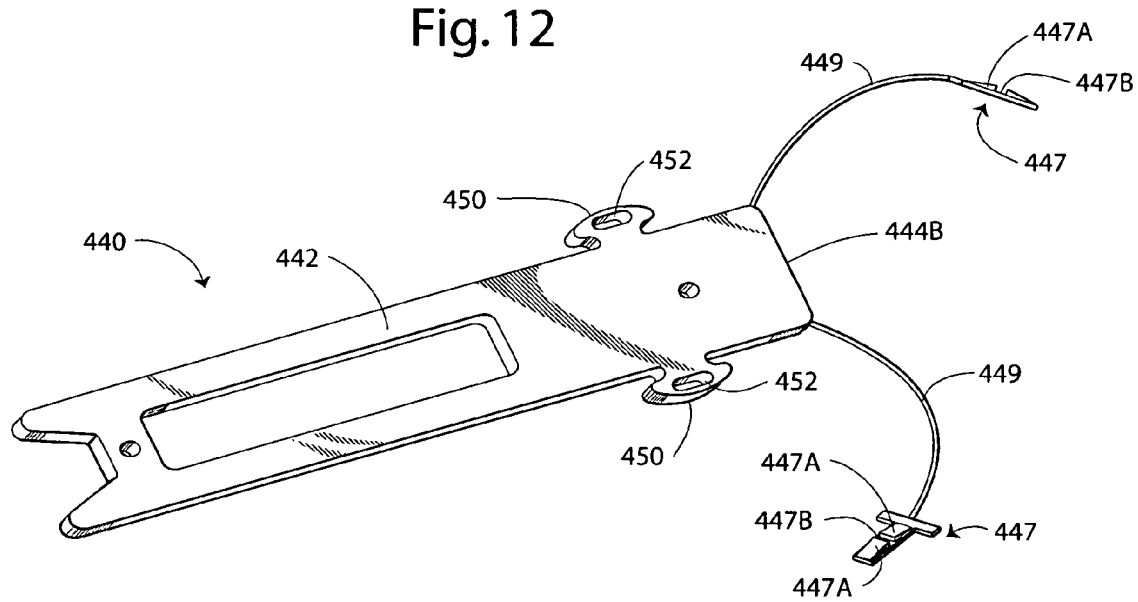
FIG. 12 is a perspective view of an insert member according to further embodiments of the present invention.

With reference to FIG. 12, an insert member 440 according to further embodiments of the present invention is shown therein. The insert member 440 may be used in place of the insert member 140, for example, and may be used in a kit (e.g., the kit 100) as described above in place of the insert member 140.

The insert member 440 corresponds to the insert member 140 except that the insert member 440 further includes a pair of fastener portions 447 coupled to the body 442 adjacent the rear end 444B by respective flexible tethers 449. The fastener portions 447 and the tethers 449 may be integrally molded with the body 442 and formed of the same material as the body 442.

Figure 3:
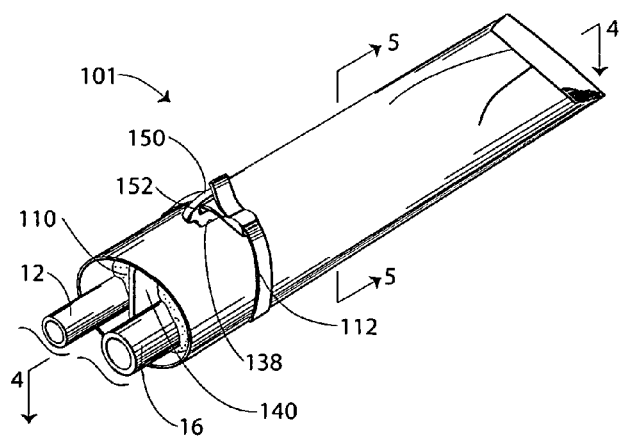
FIG. 3 is a fully assembled, perspective view of the protected electrical connection assembly of FIG. 1.

In use and with reference to FIGS. 3 and 12, the insert member 440 is installed in the cap 130 in the same manner as described above such that the projections 450 extend through and interlock with the holes 138. However, rather than secure the projections 450 with a tie wrap, the fastener portions 447 are each inserted into the hole 452 of a respective one of the projections 450. More particularly, the tethers 449 are folded forwardly to position the fastener portions 447 in the holes 452. The fastener portions 447 are retained in place by protrusions 447A defining recesses 447B therebetween. The leading protrusion 447A of each fastener portion 447 may be ramped to facilitate insertion of the fastener portion 447 into the hole 452.

According to further embodiments (not shown), two or more separate and distinct gel pads can be mounted on opposed sides of an insert member. Gel pads may be retained on an insert member by their inherent adherence and/or another mechanism may be used such as a layer of adhesive and/or mechanical structure(s).

Various other modifications may be made to the kits described above in accordance with embodiments of the invention. For example, according to some embodiments, the projection 250 is omitted and the tie wrap 212, the hole 252 and the cap holes 238A, 238B are relied upon to secure the insert assembly 241 in place. According to other embodiments, the insert assembly itself is not provided with a securing feature; rather, a supplemental securing clamp, pin, etc. (e.g., as disclosed in U.S. Pat. No. 6,627,818 to Kamel et al., the disclosure of which is incorporated herein by reference) is employed.

While the foregoing kits preferably employ tie wraps 112, 212 as shown, the insert members 141, 241 and the caps 130, 230 thereof may also be retained using other suitable fasteners or devices. For example, the tie wraps may be replaced by or supplemented with one or more pins, a tape wrap, a clamp ring, or a clip. Also, the caps 130, 230 may be formed of a heat shrinkable thermoplastic and heated after the connection assembly 10 has been inserted.

As noted above, the gel 110, 210 can be cured in situ. With the cap 130, 230 oriented vertically with the open end up, the liquid, uncured gel may be dispensed into the cavity of the molded cap 130, 230 and thereafter cured. If the fill level overlaps the holes 138, 238A, 238B, thin skins of the elastomeric cap material may cover the holes 138, 238 to prevent seepage of the uncured gel.

The foregoing kits (e.g., the kits 100, 200) and other kits as described herein may also be used without the cap gels (e.g., the gels 110, 210) and/or without the insert assembly gels (e.g., the gel pads 160, 260, 360) or other sealants to form protected electrical connection assemblies.

It will be appreciated that the gel pads 160, 260, 360 of the insert assemblies 141, 241, 341 will provide gel portions that face opposing sides of the connection crotch 14 and opposing cable portions. It is also contemplated that a gel pad may be provided on only one side of an insert member (e.g., only the gel portion 364 may be provided on the insert member 340 of FIG. 11).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed is:

1. A connection protector kit for use with an electrical stub connection assembly, the stub connection assembly including first and second conductors forming a connection and defining a crotch therebetween, the kit comprising:
   an insert assembly including:
      an insert member having opposed front and rear portions and a securing structure on the rear portion; and
      a sealant pad mounted on the insert member; and
   a cap defining a cavity and an opening communicating with the cavity;
   wherein the cavity and the opening are adapted to receive the stub connection assembly and the insert assembly is adapted to fit within the crotch of the stub connection assembly when the stub connection assembly is mounted in the cavity; and
   wherein the kit is adapted to be assembled such that the stub connection assembly is disposed in the cavity of the cap and the insert member is positioned in the crotch of the stub connection assembly with the front portion engaging the connection and the securing structure couples the insert member to the cap at a location spaced apart from the connection to thereby limit displacement of the stub connection assembly relative to the cap.

2. The kit of claim 1 including a cap sealant disposed in the cavity of the cap.

3. The kit of claim 2 wherein the cap sealant and the sealant pad each include a gel.

4. The kit of claim 1 wherein the sealant pad includes a gel.

5. The kit of claim 1 including an opening defined in the insert member, and wherein the sealant pad is mounted in the opening of the insert member.

6. The kit of claim 1 wherein the insert member includes an upstanding wall and the sealant pad is mounted on the upstanding wall.

7. A method for protecting a stub connection assembly, the stub connection assembly including first and second conductors forming a connection and defining a crotch therebetween, the method comprising:
   providing an insert assembly including an insert member having opposed front and rear portions and a securing structure on the rear portion and a sealant pad mounted on the insert member;
   providing a cap defining a cavity and an opening communicating with the cavity;
   mounting the insert assembly in the crotch of the stub connection assembly; thereafter
   inserting the stub connection assembly with the insert assembly mounted therein into the cavity of the cap such that the stub connection assembly is disposed in the cavity of the cap and the insert member is positioned in the crotch of the stub connection assembly with the front portion engaging the connection; and
   coupling the insert member to the cap at a location spaced apart from the connection using the securing structure to thereby limit displacement of the stub connection assembly relative to the cap.

8. The method of claim 7 wherein inserting the stub connection assembly into the cavity includes inserting the stub connection assembly with the insert assembly mounted therein into the cavity such that the stub connection assembly displaces a cap sealant in the cavity.

9. The method of claim 7 further including folding the sealant pad about and onto the insert member prior to mounting the insert assembly in the crotch of the stub connection assembly.

10. The method of claim 7 wherein the sealant pad includes a gel.

11. A connection protector kit for use with an electrical stub connection assembly, the stub connection assembly including first and second conductors forming a connection and defining a crotch therebetween, the kit comprising:
   a) a cap defining a cavity and an opening communicating with the cavity;
   b) a cap sealant disposed in the cavity; and
   c) an insert member having opposed front and rear portions and a securing structure on the rear portion;
   d) wherein the kit is adapted to be assembled such that the stub connection assembly is disposed in the cavity of the cap and the insert member is positioned in the crotch of the stub connection assembly with the front portion engaging the connection and the securing structure coupling the insert member to the cap at a location spaced apart from the connection to thereby limit displacement of the stub connection assembly relative to the cap.

12. The kit of claim 11 wherein:
   the cap includes a side wall and a cap hole in the sidewall; and
   the securing structure includes a projection adapted to extend through the cap hole to limit axial displacement of the insert member relative to the cap.

13. The kit of claim 12 wherein the projection is adapted to interlock with the cap hole.

14. The kit of claim 13 including a fastener portion adapted to secure the projection in the cap hole, wherein the fastener portion is joined to the insert member by a tether.

15. The kit of claim 12 wherein the insert member includes a projection hole defined in the projection and adapted to receive a fastener to secure the projection in the cap hole.

16. The kit of claim 11 wherein:
   the cap includes a side wall and a cap hole defined in the side wall;
   the securing structure includes a fastener hole defined in the insert member; and
   the cap hole and the fastener hole are adapted to each receive a fastener therethrough to limit axial displacement of the insert member relative to the cap.

17. The kit of claim 11 wherein, when the kit is assembled with the stub connection assembly, the location of the coupling between the securing structure and the cap is spaced apart from the connection a distance of at least about 100 mm.

18. The kit of claim 11 wherein the insert member is adapted to retain the stub connection assembly at at least a prescribed depth within the cap without substantially deforming at least a region of the cap surrounding the connection.

19. The kit of claim 11 including a sealant pad mounted on the insert member.

20. The kit of claim 11 wherein the cap sealant includes a gel.

21. The kit of claim 11 wherein the cap is flexible.

* * * * *